United States Patent
Hsieh et al.

(10) Patent No.: US 10,032,054 B2
(45) Date of Patent: Jul. 24, 2018

(54) ROTATABLE ASSEMBLY AND SCANNING DEVICE INCLUDING THE SAME

(71) Applicant: WISTRON CORP., New Taipei (TW)

(72) Inventors: Shin-Yi Hsieh, New Taipei (TW); Cheng-Tang Chang, New Taipei (TW); Chih-Wei Juan, New Taipei (TW); Ping-Sheng Yeh, New Taipei (TW)

(73) Assignee: WISTRON CORP., New Taipei (TW)

( * ) Notice: Subject to any disclaimer, the term of this patent is extended or adjusted under 35 U.S.C. 154(b) by 452 days.

(21) Appl. No.: 14/839,575

(22) Filed: Aug. 28, 2015

(65) Prior Publication Data

US 2016/0357999 A1 Dec. 8, 2016

(30) Foreign Application Priority Data

Jun. 3, 2015 (TW) ................. 104118029

(51) Int. Cl.
*F16M 11/12* (2006.01)
*G06K 7/10* (2006.01)
(Continued)

(52) U.S. Cl.
CPC ......... *G06K 7/10623* (2013.01); *F16M 11/10* (2013.01); *F16M 11/12* (2013.01); *F16M 11/2014* (2013.01); *Y10T 403/32591* (2015.01)

(58) Field of Classification Search
CPC ........ F16C 11/04; F16C 11/103; F16M 11/08; F16M 11/10; F16M 11/12; F16M 11/125; F16M 11/126; F16M 11/128; F16M 11/2014; F16M 11/2021; F16M 11/2035; F16M 11/2057; F16M 11/2064;
(Continued)

(56) References Cited

U.S. PATENT DOCUMENTS 4,219,899 A * 9/1980 Zurawin ................. B05C 17/00
 15/144.2
4,654,764 A * 3/1987 Hsiao ........................ F21L 4/04
 362/199

(Continued)

FOREIGN PATENT DOCUMENTS

TW 200950664 A 12/2009
TW M471527 U 2/2014
TW 201447164 A 12/2014

OTHER PUBLICATIONS

TW Office Action dated Oct. 21, 2015 as received in Application No. 104118029 (Machine Translation).

*Primary Examiner* — Josh Skroupa
(74) *Attorney, Agent, or Firm* — Maschoff Brennan

(57) ABSTRACT

A rotatable assembly includes a rotatable collar, a rotatable stopper and a fixed stopper. The rotatable collar has a first slide groove. The rotatable stopper includes a first slider and a second slider which are opposite to each other. The first slider slidably is installed in the first slide groove. The rotatable collar is rotatable relative to the rotatable stopper within a first rotatable angle by the first slider. The fixed stopper has a second slide groove. The second slider is slidably installed in the second slide groove. The rotatable stopper is rotatable relative to the fixed stopper within a second rotatable angle by the second slider. A sum of the first rotatable angle and the second rotatable angle is 360 degrees.

20 Claims, 13 Drawing Sheets

(51) Int. Cl.
*F16M 11/10* (2006.01)
*F16M 11/20* (2006.01)

(58) Field of Classification Search
CPC . F16M 11/2071; G06F 1/1681; G06F 1/1684;
G06F 1/1696; G06K 7/10623; G06K
7/10881; H05K 7/16; Y10T 403/32008;
Y10T 403/32027; Y10T 403/32041; Y10T
403/32114; Y10T 403/32155; Y10T
403/32557; Y10T 403/32591
USPC .......... 403/53, 55, 57, 66, 71, 113, 116, 117
See application file for complete search history.

(56) References Cited

U.S. PATENT DOCUMENTS

| | | | | |
|---|---|---|---|---|
| 5,024,415 A * | 6/1991 | Purens | ................. | F16M 11/126 248/349.1 |
| 5,209,446 A * | 5/1993 | Kawai | ................. | F16M 11/126 108/139 |
| 5,477,044 A * | 12/1995 | Aragon | .............. | G06K 7/10881 235/462.45 |
| 5,632,463 A * | 5/1997 | Sung | ................... | F16M 11/126 248/349.1 |
| 6,644,616 B1 * | 11/2003 | Tsukuda | ............... | F16M 11/126 248/183.2 |
| 7,165,724 B2 * | 1/2007 | Shimoda | ............ | G06K 7/10881 235/462.45 |
| 7,243,931 B2 * | 7/2007 | Chen | ...................... | B62K 3/002 280/124.11 |
| 7,334,956 B2 * | 2/2008 | Taylor | ................... | B63B 35/815 114/361 |
| 7,344,144 B2 * | 3/2008 | Lin | ........................ | B62B 3/001 280/47.34 |
| 7,681,866 B2 * | 3/2010 | Lehmann | ............ | E04F 11/1834 256/65.01 |
| 7,708,239 B2 * | 5/2010 | Watanabe | .............. | F16M 11/08 248/125.7 |
| 7,770,862 B2 * | 8/2010 | Chen | ...................... | F16M 11/10 248/188.91 |
| 7,836,623 B2 * | 11/2010 | Wang | ..................... | A47G 1/142 248/458 |
| 7,850,386 B2 * | 12/2010 | Bensussan | ............... | A47L 13/42 15/144.2 |
| 8,066,232 B2 * | 11/2011 | Wills | ...................... | F16M 11/10 248/121 |
| 8,246,266 B2 * | 8/2012 | Lang | ...................... | B60R 1/066 359/874 |
| 9,070,007 B2 * | 6/2015 | Mistkawi | ........... | G06K 7/10821 |
| 9,718,561 B2 * | 8/2017 | Blackburn | ............. | B64D 47/08 |
| 9,726,209 B2 * | 8/2017 | Moller Hansen | .... | A47B 13/021 |
| 2014/0252189 A1 * | 9/2014 | Kifer | ...................... | F16M 11/10 248/299.1 |

\* cited by examiner

ROTATABLE ASSEMBLY AND SCANNING DEVICE INCLUDING THE SAME

CROSS-REFERENCE TO RELATED APPLICATIONS

This non-provisional application claims priority under 35 U.S.C. § 119(a) on Patent Application No(s). 104118029 filed in Taiwan, R.O.C. on Jun. 3, 2015, the entire contents of which are hereby incorporated by reference.

TECHNICAL FIELD

The disclosure relates to a rotatable assembly and a scanning device including the same, more particularly to the rotatable assembly being capable of rotating 360 degrees and the scanning device including the same.

BACKGROUND

A Barcode scanner connected to a computer for scanning a barcode is widely used in convenience stores, shopping malls and book stores. When the barcodes on goods are scanned by the barcode scanner, the information of the goods is displayed on the computer so that the management and the checking out of the goods become easier. Due to a scan head of the conventional barcode scanner is fixed to the base of the conventional barcode scanner and the operation space for scanning is constrained by the environment, the movement of scanning the goods may be restricted in a specific way which is not comfortable for every user. Thus, not every user can rapidly and smoothly scan the goods by the conventional barcode scanner.

In order to rapidly and smoothly scan the goods by the conventional barcode scanner, some manufacturers provides a scan head which is tiltable relative to the base of the barcode scanner. Therefore, every user can tilt the scan head according to the environment surrounding the barcode scanner and the personal habit so that every user can rapidly and smoothly scan the goods by the barcode scanner.

SUMMARY

According to one embodiment of the present disclosure, a rotatable assembly includes a rotatable collar, a rotatable stopper and a fixed stopper. The rotatable collar has a first slide groove. The rotatable stopper includes a first slider and a second slider which are opposite to each other. The first slider slidably is installed in the first slide groove. The rotatable collar is rotatable relative to the rotatable stopper within a first rotatable angle by the first slider. The fixed stopper has a second slide groove. The second slider is slidably installed in the second slide groove. The rotatable stopper is rotatable relative to the fixed stopper within a second rotatable angle by the second slider. A sum of the first rotatable angle and the second rotatable angle is 360 degrees.

According to the other embodiment, a scanning device includes a rotatable assembly and an optical scanner. The rotatable assembly includes a rotatable collar, a rotatable stopper and a fixed stopper. The rotatable collar has a first slide groove. The rotatable stopper includes a first slider and a second slider which are opposite to each other. The first slider is slidably installed in the first slide groove. The rotatable collar is rotatable relative to the rotatable stopper within a first rotatable angle by the first slider. The fixed stopper has a second slide groove. The second slider is slidably installed in the second slide groove. The rotatable stopper is rotatable relative to the fixed stopper within a second rotatable angle by the second slider. A sum of the first rotatable angle and the second rotatable angle is 360 degrees. The optical scanner is connected to the rotatable collar.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 3 to FIG. 6 are front views of a housing of the scanning device illustrated in FIG. 1 rotating in a direction of an arrow a;

DETAILED DESCRIPTION

Figure 1:
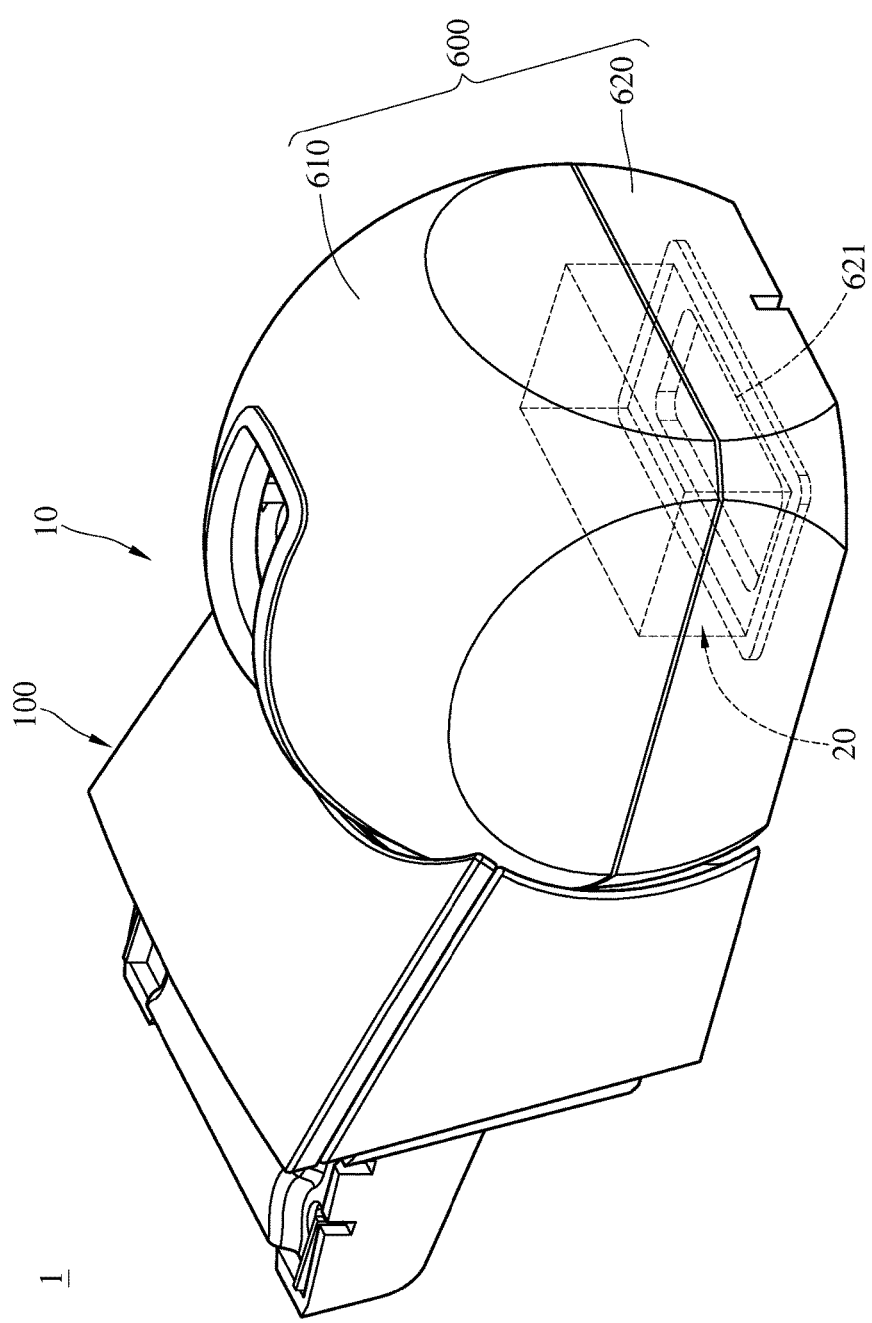
FIG. 1 is a schematic view of a scanning device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
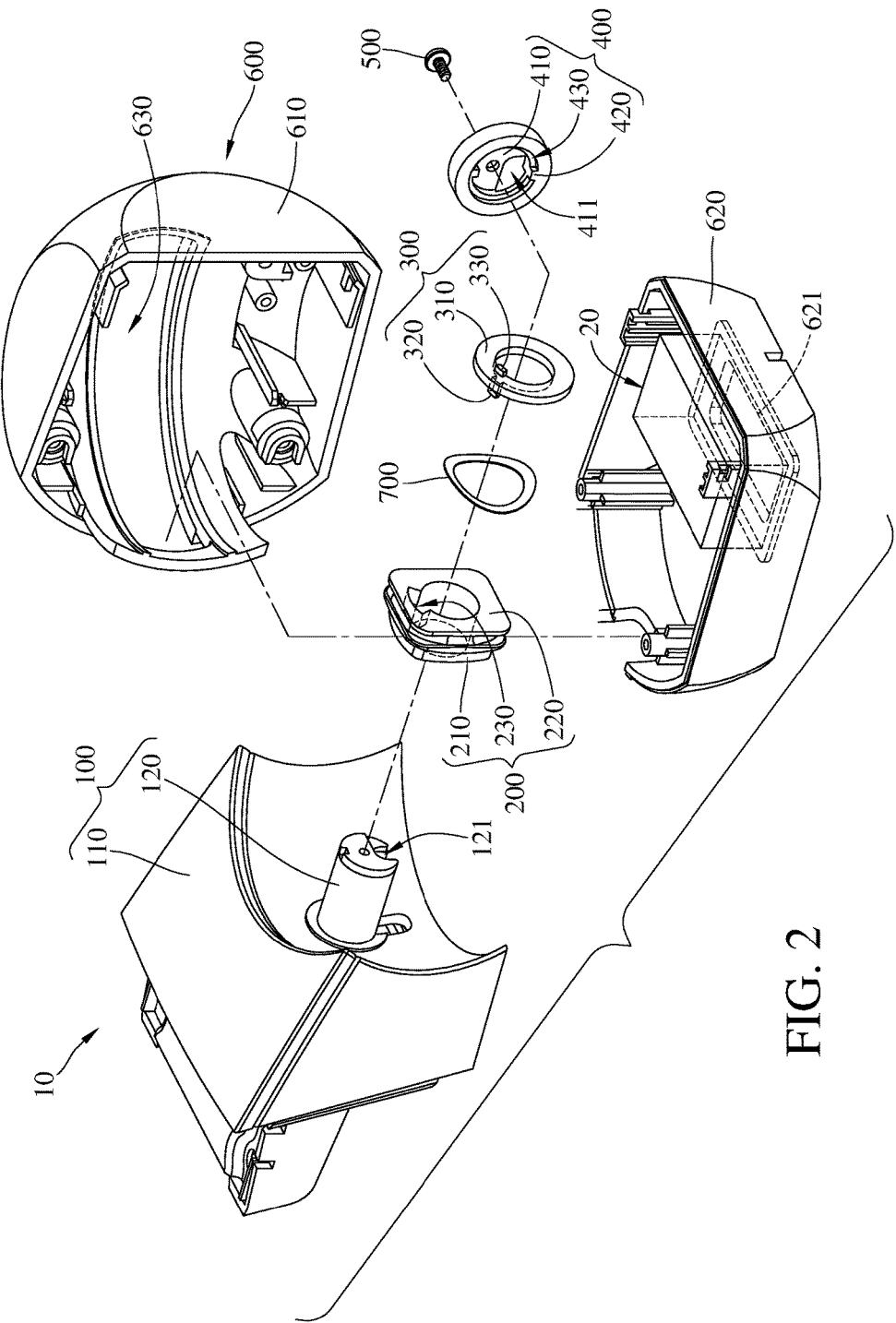
FIG. 2 is an exploded view of the scanning device illustrated in FIG. 1.

Please refer to FIG. 1 and FIG. 2. FIG. 1 is a schematic view of a scanning device according to an embodiment of the disclosure. FIG. 2 is an exploded view of the scanning device illustrated in FIG. 1. In this embodiment of the present disclosure, the scanning device 1 includes a rotatable assembly 10 and an optical scanner 20. The rotatable assembly 10 includes a fixing part 100, a rotatable collar 200, a rotatable stopper 300, a fixed stopper 400, a fixing component 500 and a housing 600.

The fixing part 100 includes a base body 110 and an axle 120. The axle 120 protrudes from the base body 110. Furthermore, the axle 120 has a through hole 121 extending along a direction parallel to an axial direction of the axle 120, and the through hole 121 is for cable management.

The rotatable collar 200 includes a first base part 210 and a first protrusion 220. The first base part 210 is rotatably installed around the axle 120 of the fixing part 100. The first protrusion 220 protrudes from a side of the first base part 210 which is opposite to the base body 110 of the fixing part 100. Furthermore, the first protrusion 220 forms a first slide groove 230 on the side of the first base part 210 which is opposite to the base body 110 of the fixing part 100. In other words, the first protrusion 220 protrudes from the first base part 210 and is connected to two ends of the first slide groove 230 which are opposite to each other. In this embodiment of the present disclosure, the first slide groove 230 is formed by the first protrusion 220. However, the disclosure is not limited to the way that the first slide groove 230 is formed. In other embodiments of the present disclosure, the first base part 210 recesses from a side surface opposite to the base body 110 so as to form the first slide groove 230.

In addition, the number of the first protrusion 220 is one in this embodiment of the present disclosure, and the first protrusion 220 has a curved structure. Therefore, two ends of the first protrusion 220 which are opposite to each other are directly connected to two ends of the first slide groove 230 which are opposite to each other, respectively, so that a length of the first slide groove 230 is determined by the first protrusion 220. However, the disclosure is not limited to the number of the first protrusion 220. In other embodiments of the present disclosure, the numbers of the first protrusion can be two. The two first protrusions with column structure are located at two ends of the first slide groove which are opposite to each other, respectively.

The rotatable stopper 300 includes a second base part 310, a first slider 320 and a second slider 330. The first slider 320 and the second slider 330 are opposite to each other. The second base part 310 of the rotatable stopper 300 is rotatably installed around the axle 120 of the fixing part 100. The first slider 320 and the second slider 330 are connected to two sides of the second base part 310 which are opposite to each other, respectively. In detail, the first slider 320 protrudes from the side of the second base part 310 facing the base body 110 of the fixing part 100, and the second slider 330 protrudes from the side of the second base part 310 away from the base body 110 of the fixing part 100. In addition, the first slider 320 is slidably installed in the first slide groove 230, and therefore the rotatable collar 200 is rotatable relative to the rotatable stopper 300 within a first rotatable angle θ1 by the first slider 320.

Figure 3:
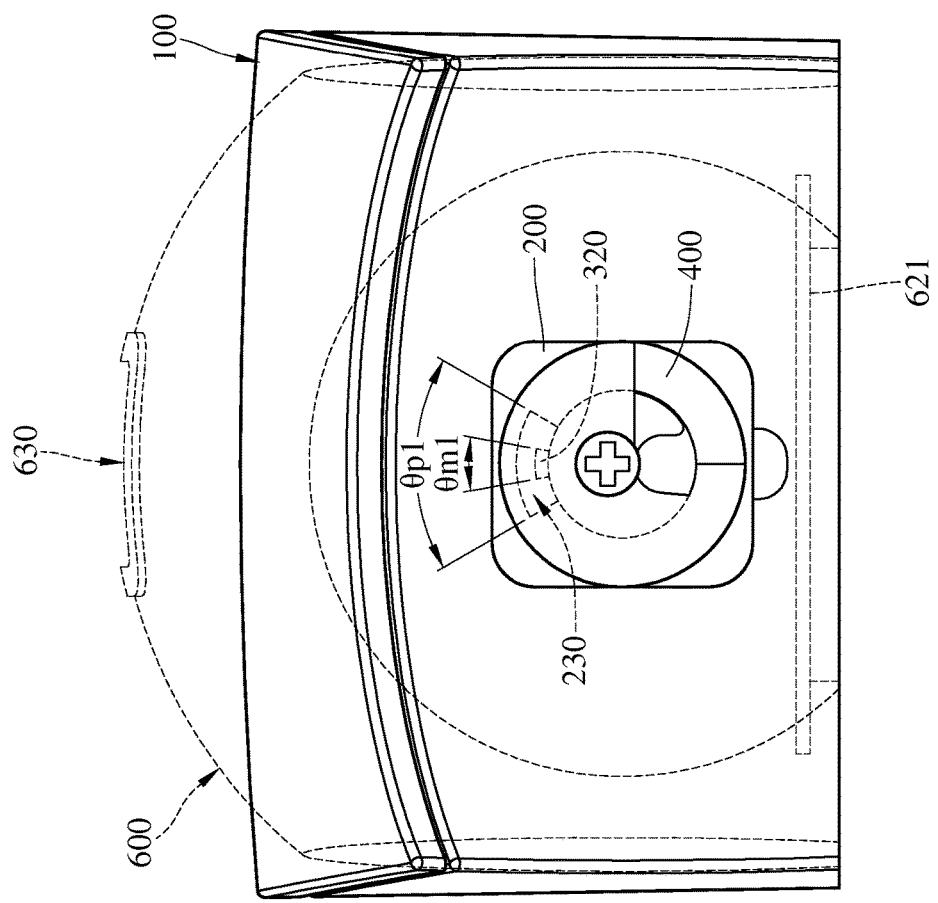

Furthermore, referring to FIG. 3, the first rotatable angle θ1 is equal to a difference between a rotatable angle θp1 of the first slide groove 230 and an occupied angle θm1 in the first slide groove 230 which is occupied by the first slider 320. In this embodiment of the present disclosure, the rotatable angle θp1 of the first slider 320 within the first slide groove 230 is 60 degrees, and the occupied angle θm1 in the first slide groove 230 which is occupied by the first slider 320 is 20 degrees, and therefore the first rotatable angle θ1 is 40 degrees. In other words, the rotatable collar 200 can rotate 20 degrees clockwise or counterclockwise relative to the rotatable stopper 300.

The fixed stopper 400 includes a third base part 410 and a second protrusion 420. The third base part 410 of the fixed stopper 400 is fixed to the axle 120 of the fixing part 100, for example, by a fixing block and a fixing slot. and the fixing block as well as the fixing slot are interlocked with each other. The second protrusion 420 protrudes from a side of the third base part 410 close to the base body 110 of the fixing part 100 and forms a second slide groove 430 on the side of the third base part 410 close to the base body 110 of the fixing part 100. In detail, the second protrusion 420 and the second slide groove 430 are located on the same side of the third base part 410, and the second protrusion 420 is connected to two ends of the second slide groove 430 which are opposite to each other. In addition, referring to FIG. 4, the second slider 330 is slidably installed in the second slide groove 430, and therefore the rotatable stopper 300 is rotatable relative to the fixed stopper 400 within a second rotatable angle θ2 by the second slider 330.

Figure 5:
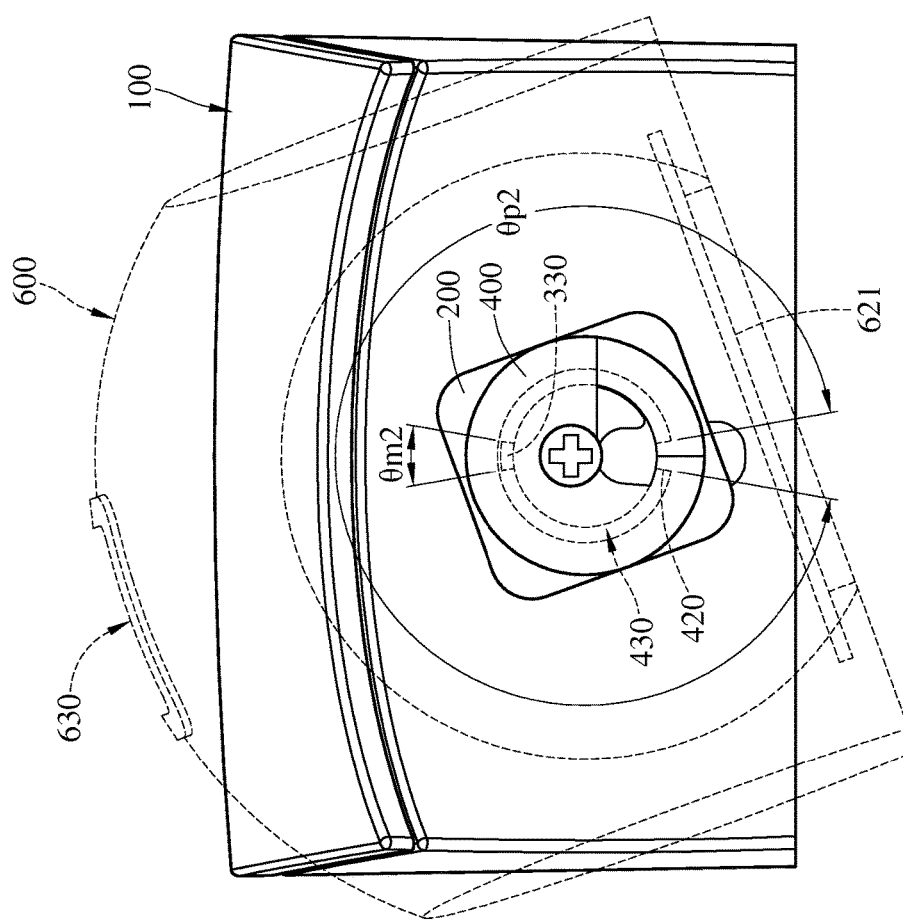

Furthermore, referring to FIG. 5, the second rotatable angle θ2 is equal to a difference between a rotatable angle θp2 of the second slide groove 430 and an occupied angle θm2 in the second slide groove 430 which is occupied by the second slider 330. In this embodiment of the present disclosure, the rotatable angle θp2 of the second slider 330 within the second slide groove 430 is 340 degrees, and the occupied angle θm2 in the second slide groove 430 which is occupied by the second slider 330 is 20 degrees, and therefore the second rotatable angle θ2 is 320 degrees. In other words, the rotatable stopper 300 can rotate 160 degrees in clockwise direction or counterclockwise direction relative to the fixed stopper 400. As a result, a sum (θ1+θ2) of the first rotatable angle θ1 (40 degrees) and the second rotatable angle θ2 (320 degrees) is 360 degrees, which means the rotatable collar 200 can rotate 180 degrees clockwise or counterclockwise relative to the fixed stopper 400.

In the embodiment of the present disclosure, the first rotatable angle θ1 is 40 degrees, and the second rotatable angle θ2 is 320 degrees. However, the disclosure is not limited to the magnitude of the first rotatable angle θ1 or the second rotatable angle θ2. In other embodiment of the present disclosure, the first rotatable angle θ1 can be 60 degrees, and the second rotatable angle θ2 can be 300 degrees. That is, both of the first rotatable angle θ1 and the second rotatable angle θ2 can be any value as long as the sum of the first rotatable angle θ1 and the second rotatable angle θ2 is 360 degrees. Moreover, in this embodiment of the present disclosure, the third base part 410 further has a slot 411 facing the through hole 121. The through hole 121 is exposed in and communicated with the slot 411, and therefore the cable is capable of going through the through hole 121 and the slot 411.

The fixing component 500 goes through and screws the third base part 410 of the fixed stopper 400 to the axle 120 of the fixing part 100.

Figure 11:
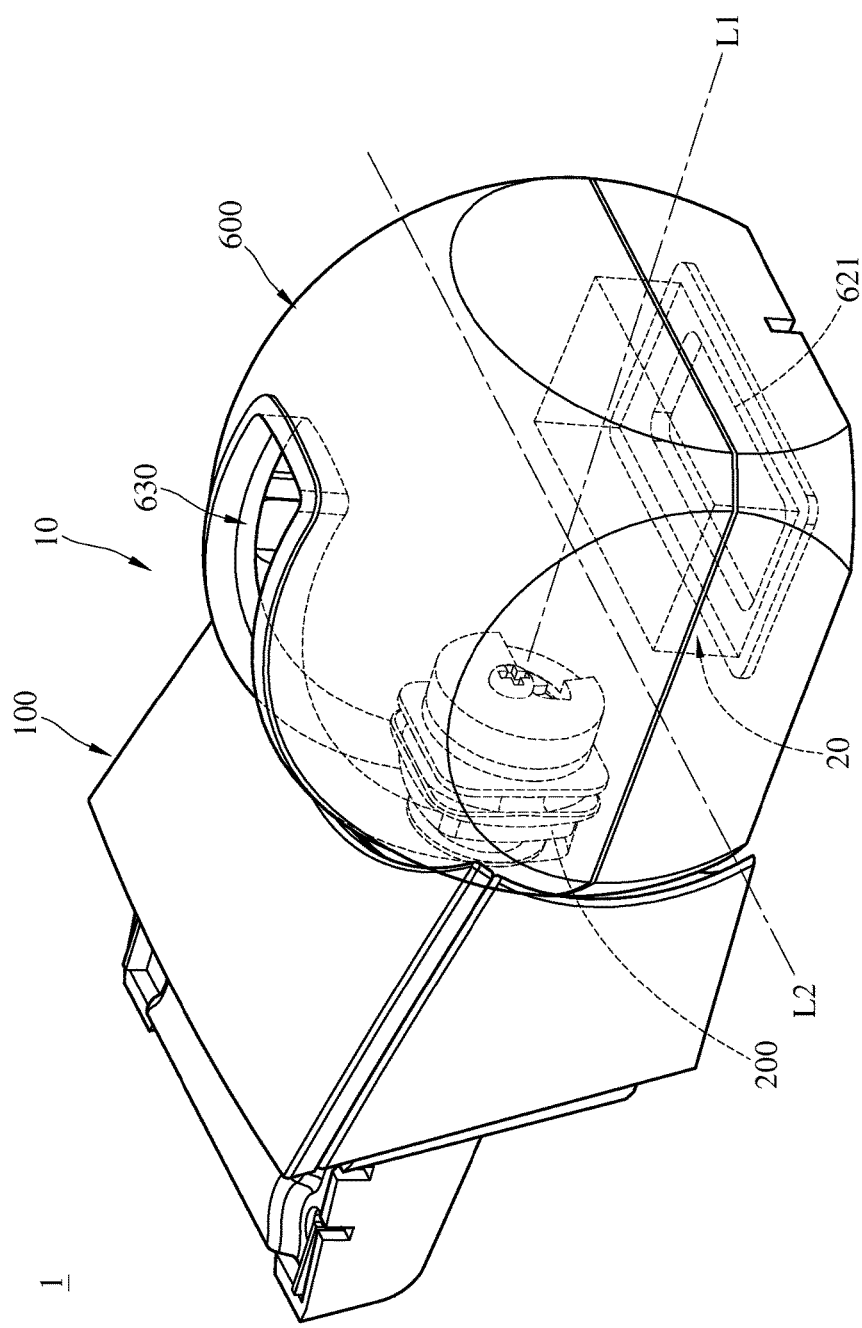
FIG. 11 to FIG. 13 are perspective views of the housing of the scanning device illustrated in FIG. 1 rotating in a direction of an arrow c.
Figure 12:
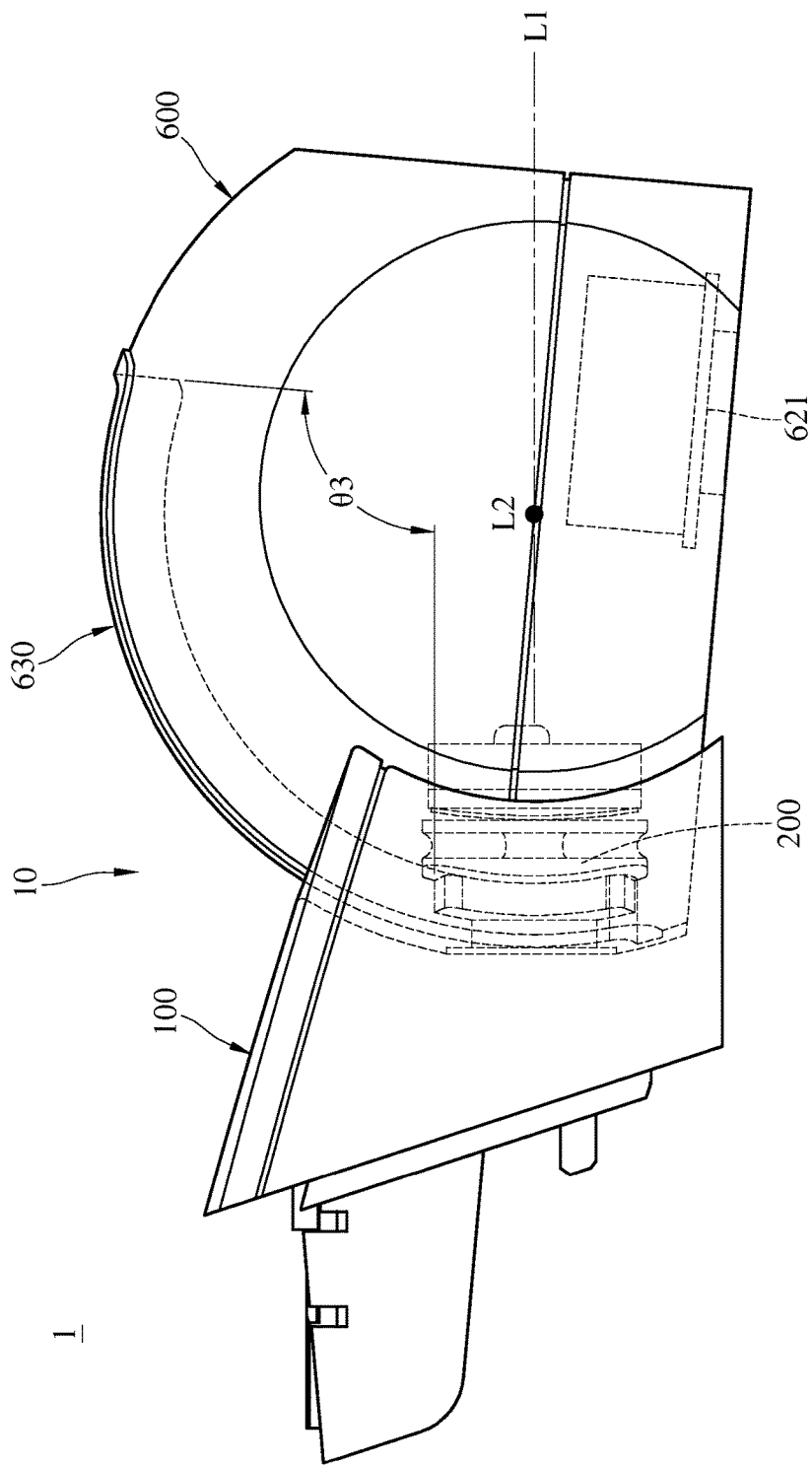

The housing 600 is movably installed on the rotatable collar 200, and the housing 600 accommodates the rotatable stopper 300, the fixed stopper 400, the fixing component 500, a part of the rotatable collar 200 and a part of the axle 120. In detail, the housing 600 has an adjustment groove 630. The rotatable collar 200 is slidably installed in the adjustment groove 630 so that the housing 600 can rotate relative to the rotatable collar 200. As shown in FIG. 11 and FIG. 12, a rotating axis L2 of the housing 600 is orthogonal to a rotating axis L1 of the rotatable collar 200. The housing 600 is capable of rotating relative to the rotatable collar 200 within a third rotatable angle θ3, and the third rotatable angle θ3 is at least 90 degrees. In this embodiment of the present disclosure, as shown in FIG. 12, the third rotatable angle θ3 is 95 degrees, which means that the housing 600 can rotate 90 degrees clockwise and 5 degrees counterclockwise.

The housing 600 in the embodiment of the present disclosure includes a top housing 610 and a bottom housing 620. The bottom housing 620, for example, is fastened to the top housing 610 by screws. An end of the adjustment groove 630 is located at the top housing 610, and the other end of the adjustment groove 630 is located at the bottom housing 620. In addition, when the housing 600 rotates relative to the axle 120 along the rotating axis L1, the housing 600 can bring the rotatable collar 200 to rotate together so that the housing 600 can rotate 180 degrees clockwise or counterclockwise with the rotatable collar 200.

The elastic component 700, for example, is a resilient pad or a compressing spring. The elastic component 700 surrounds the axle 120 of the fixing part 100 and is interposed between the first base part 210 of the rotatable collar 200 and the second base part 310 of the rotatable stopper 300. Moreover, the elastic component 700 is compressed by the first base part 210 of the rotatable collar 200 and the second base part 310 of the rotatable stopper 300. Therefore, an elastic force of the elastic component 700 drives the rotatable collar 200 to press against the fixing part 100 and drives the rotatable stopper 300 to press against the fixed stopper 400 so that a position of the housing 600 is fixed due to the frictions among the fixing part 100, the rotatable collar 200, the elastic component 700, the rotatable stopper 300 and the fixed stopper 400.

The optical scanner 20 is for scanning the barcodes. The optical scanner 20 is installed in the housing 600 and connected to the rotatable collar 200 by the housing 600. Furthermore, the bottom housing 620 of the housing 600 has a transparent part 621, and the transparent part 621 exposes a light exit surface of the optical scanner 20 to the outside so that the optical scanner 20 is capable of scanning the barcodes.

Please refer to FIG. 3 to FIG. 6. FIG. 3 to FIG. 6 are front views of a housing of the scanning device illustrated in FIG. 1 rotating in a direction of an arrow a. In order to clearly display the movement of the rotatable assembly 10, only the structures of the first slide groove 230 and the first slider 320 are shown by the dash line in FIG. 3 and FIG. 4, and only the structures of the second slide groove 430 and the second slider 330 are shown by the dash line in FIG. 5 and FIG. 6.

As shown in FIG. 3, when the housing 600 is located at an original position, the transparent part 621 of the housing 600 faces downward. Thus, the optical scanner 20 (shown in FIG. 1) is capable of scanning the barcodes of the goods placed at an area below the housing 600.

Figure 4:
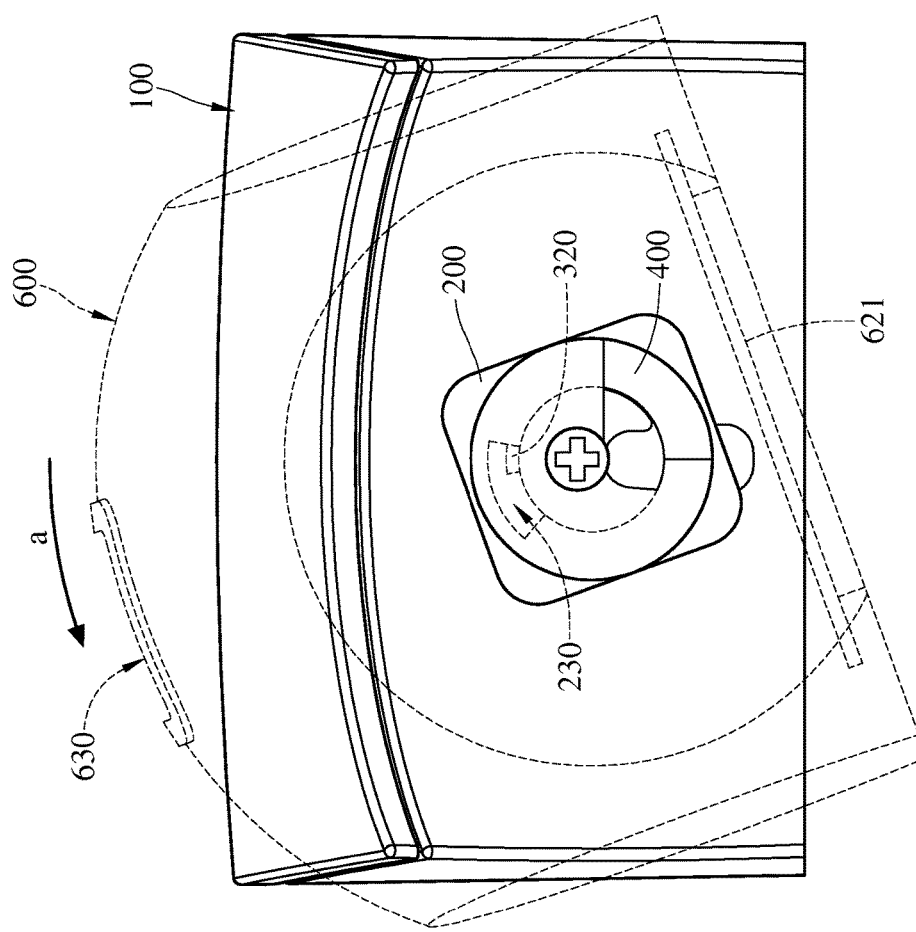

As shown in FIG. 4, when the housing 600 rotates counterclockwise (in a direction of an arrow a), the housing 600 only brings the rotatable collar 200 to rotate together. When the housing 600 rotates about 20 degrees counterclockwise, the first slider 320 of the rotatable stopper 300 in the first slide groove 230 of the rotatable collar 200 is moved to the end of the first slide groove 230 and contacting the first protrusion 220 of the rotatable collar 200.

As shown in FIG. 5, when the position of the housing 600 is the same as the position of the housing 600 in FIG. 4, the second slider 330 of the rotatable stopper 300 is located at a center of the second slide groove 430 of the fixed stopper 400. That is, the second slider 330 and the second protrusion 420 of the fixed stopper 400 are opposite to each other.

Figure 6:
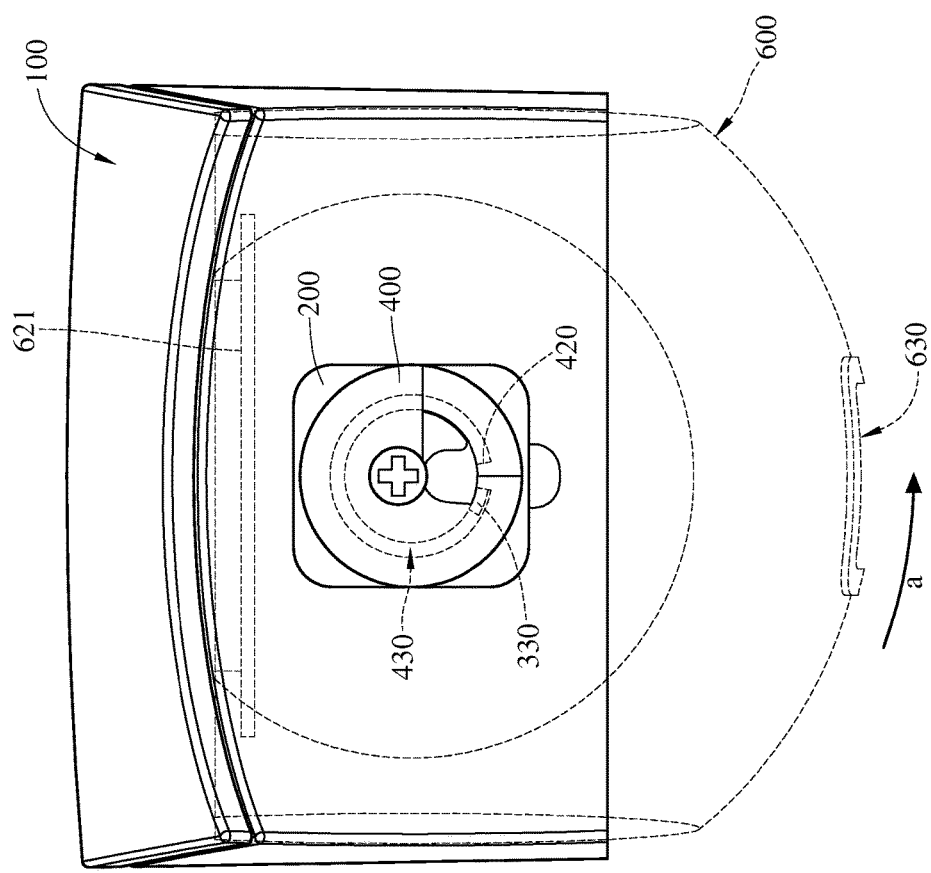

As shown in FIG. 6, when the housing 600 continues rotating counterclockwise (in a direction of the arrow a) from the position thereof in FIG. 5, the housing 600 continues bringing the rotatable collar 200 to rotate together. At this time, the first protrusion 220 of the rotatable collar 200 presses against the first slider 320 of the rotatable stopper 300 (as shown in FIG. 4) so that the rotatable collar 200 starts to bring the rotatable stopper 300 to rotate together. When the rotatable collar 200 and the rotatable stopper 300 rotate about 160 degrees counterclockwise together, the second slider 330 of the rotatable stopper 300 is blocked by the second protrusion 420 of the fixed stopper 400, and therefore the rotatable stopper 300 stops rotating relative to the fixed stopper 400. At this time, the transparent part 621 of the housing 600 faces upward so that the optical scanner 20 (as shown in FIG. 1) is capable of scanning the barcodes of the goods placed at an area above the housing 600.

In summary of the descriptions about the movement of the housing 600 in FIG. 3 to FIG. 6, the housing 600 of the scanning device 1 is capable of rotating 180 degrees counterclockwise (in the direction of the arrow a) from the original position. Thus, the optical scanner 20 (as shown in FIG. 1) is capable of scanning barcodes of the goods located below, at the right side and above the housing 600.

Please refer to FIG. 7 to FIG. 10. FIG. 7 to FIG. 10 are front views of a housing of the scanning device illustrated in FIG. 1 rotating in a direction of an arrow b. In order to clearly display the movement of the rotatable assembly 10, only the structures of the first slide groove 230 and the first slider 320 are shown by the dash line in FIG. 7 and FIG. 8, and only the structures of the second slide groove 430 and the second slider 330 are shown by the dash line in FIG. 9 and FIG. 10.

Figure 7:
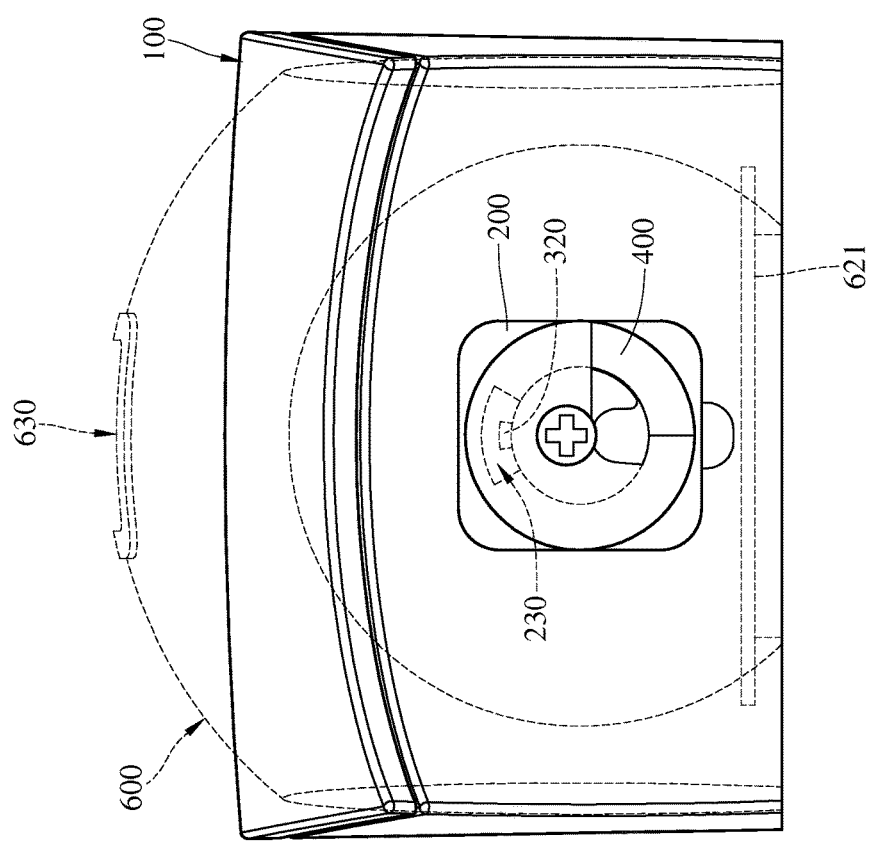
FIG. 7 to FIG. 10 are front views of the housing of the scanning device illustrated in FIG. 1 rotating in a direction of an arrow b.

As shown in FIG. 7, when the housing 600 is located at the original position, the transparent part 621 of the housing 600 faces downward. Thus, the optical scanner 20 (shown in FIG. 1) is capable of scanning the barcodes of the goods placed at an area below the housing 600.

Figure 8:
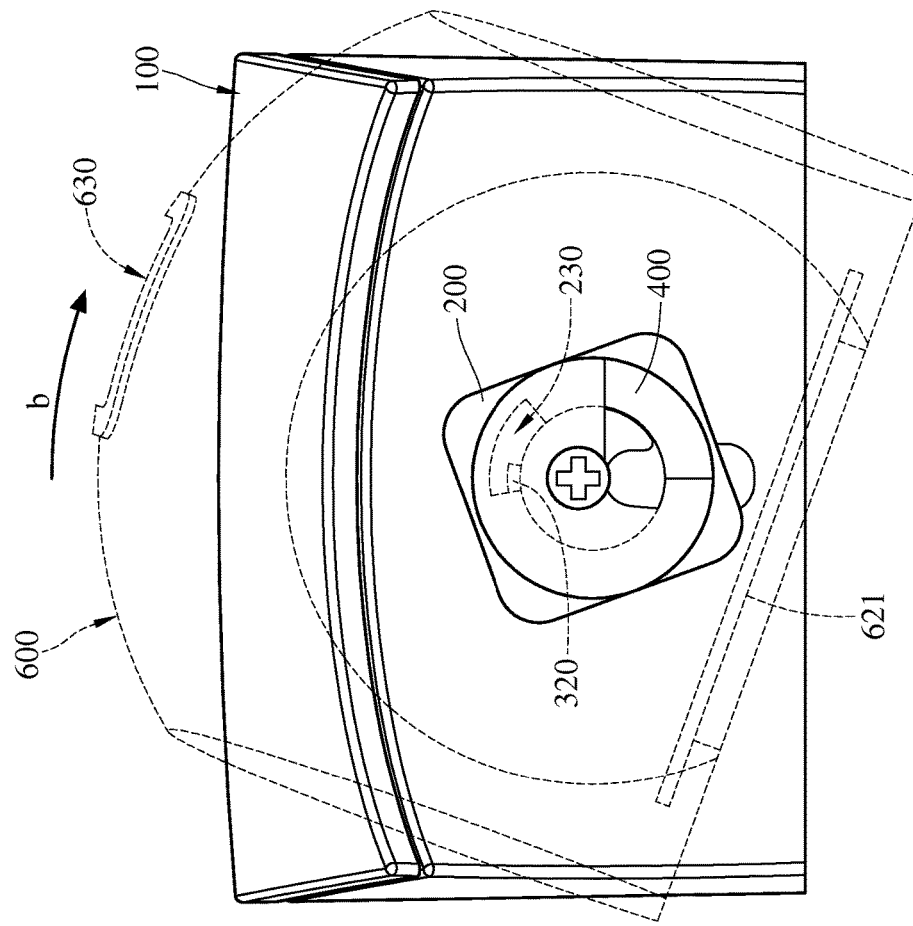

As shown in FIG. 8, when the housing 600 rotates clockwise (in a direction of an arrow b), the housing 600 only brings the rotatable collar 200 to rotate together. When the housing 600 rotates about 20 degrees clockwise, the first slider 320 of the rotatable stopper 300 in the first slide groove 230 of the rotatable collar 200 is moved to the other end of the first slide groove 230 and contacting the first protrusion 220 of the rotatable collar 200.

Figure 9:
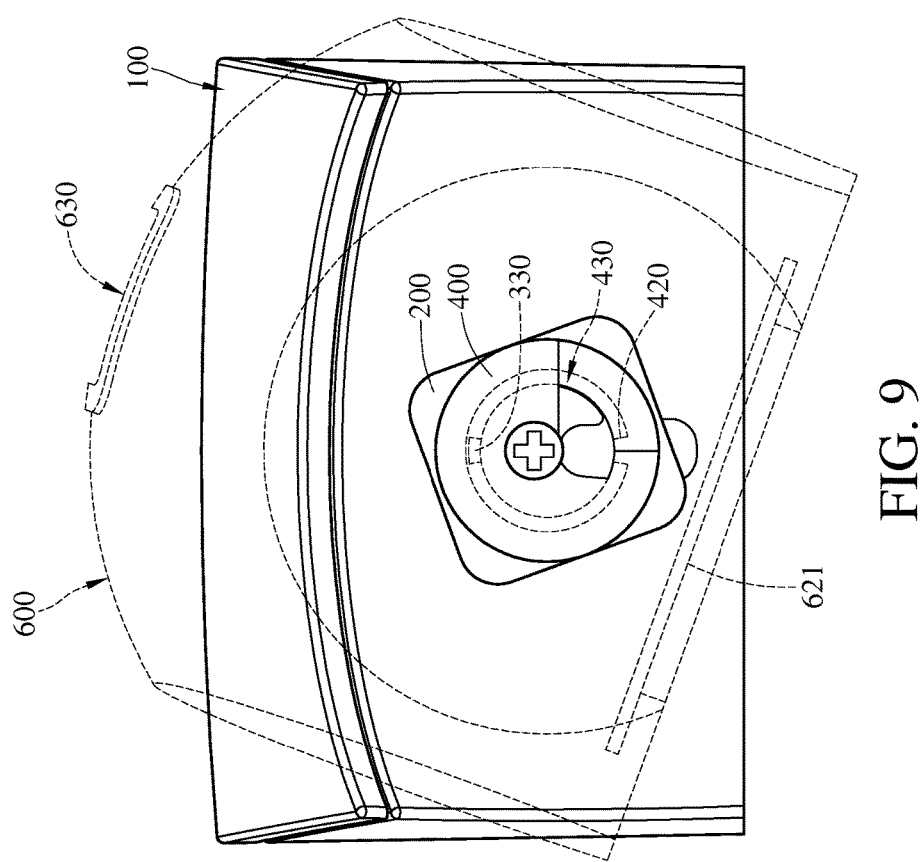

As shown in FIG. 9, when the position of the housing 600 is the same as the position of the housing 600 in FIG. 8, the second slider 330 of the rotatable stopper 300 is located at the center of the second slide groove 430 of the fixed stopper 400. That is, the second slider 330 and the second protrusion 420 of the fixed stopper 400 are opposite to each other. In brief, the position of the second slider 330 in FIG. 9 is the same as the position thereof in FIG. 5.

Figure 10:
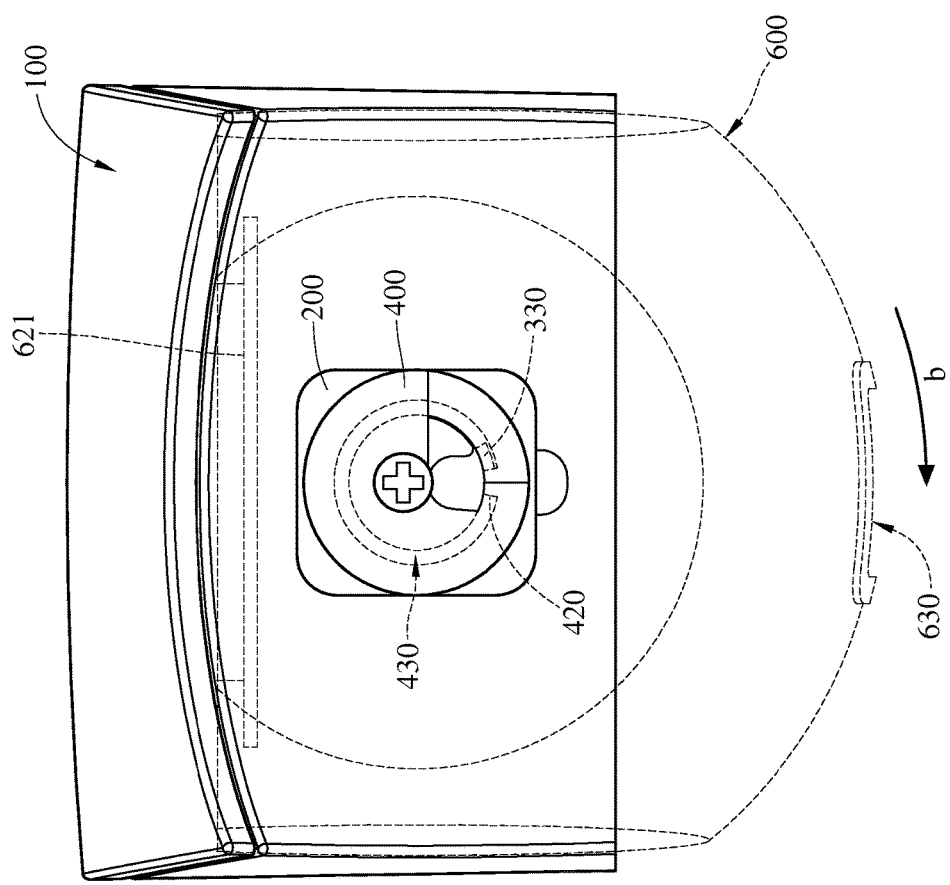

As shown in FIG. 10, when the housing 600 continues rotating clockwise (in a direction of the arrow b) from the position thereof in FIG. 9, the housing 600 continues bringing the rotatable collar 200 to rotate together. At this time, the first protrusion 220 of the rotatable collar 200 is pressing against the first slider 320 of the rotatable stopper 300 (as shown in FIG. 8) so that the rotatable collar 200 starts to bring the rotatable stopper 300 to rotate together. When the rotatable collar 200 and the rotatable stopper 300 rotate about 160 degrees clockwise together, the second slider 320 of the rotatable stopper 300 is blocked by the second protrusion 420 of the fixed stopper 400, and therefore the rotatable stopper 300 stops rotating relative to the fixed stopper 400. At this time, the transparent part 621 of the housing 600 faces upward so that the optical scanner 20 (as shown in FIG. 1) is capable of scanning the barcodes of the goods placed at an area above the housing 600.

In summary of the descriptions about the movement of the housing 600 in FIG. 7 to FIG. 10, the housing 600 of the scanning device 1 is capable of rotating 180 degrees clockwise (in the direction of the arrow b) from the original position thereof. Thus, the optical scanner 20 (as shown in FIG. 1) is capable of scanning the barcodes on the goods located below, at the left side and above the housing 600.

According to this embodiment of the present disclosure, the housing 600 is capable of rotating 180 degrees counterclockwise or clockwise relative to the fixing part 100 so that the optical scanner 20 installed in the housing 600 has a 360 degrees scanning range. Thus, the scanning device 1 is favorable for solving the problem of the rotatable angle limitation of the scanning device 1 so that the user is able to rapidly and smoothly scan the barcodes on the goods by the scanning device 1.

In addition, the 360 degrees scanning range of the rotatable assembly 10 of the scanning device 1 is composed of a 180 degrees counterclockwise rotating range and a 180 degrees clockwise rotating range of the rotatable assembly 10 so as to prevent twisting of the cable. However, the disclosure is not limited to the rotating direction of the rotatable assembly 10. In other embodiments of the present disclosure, the rotatable assembly can only rotate in one direction which is counterclockwise or clockwise.

Figure 13:
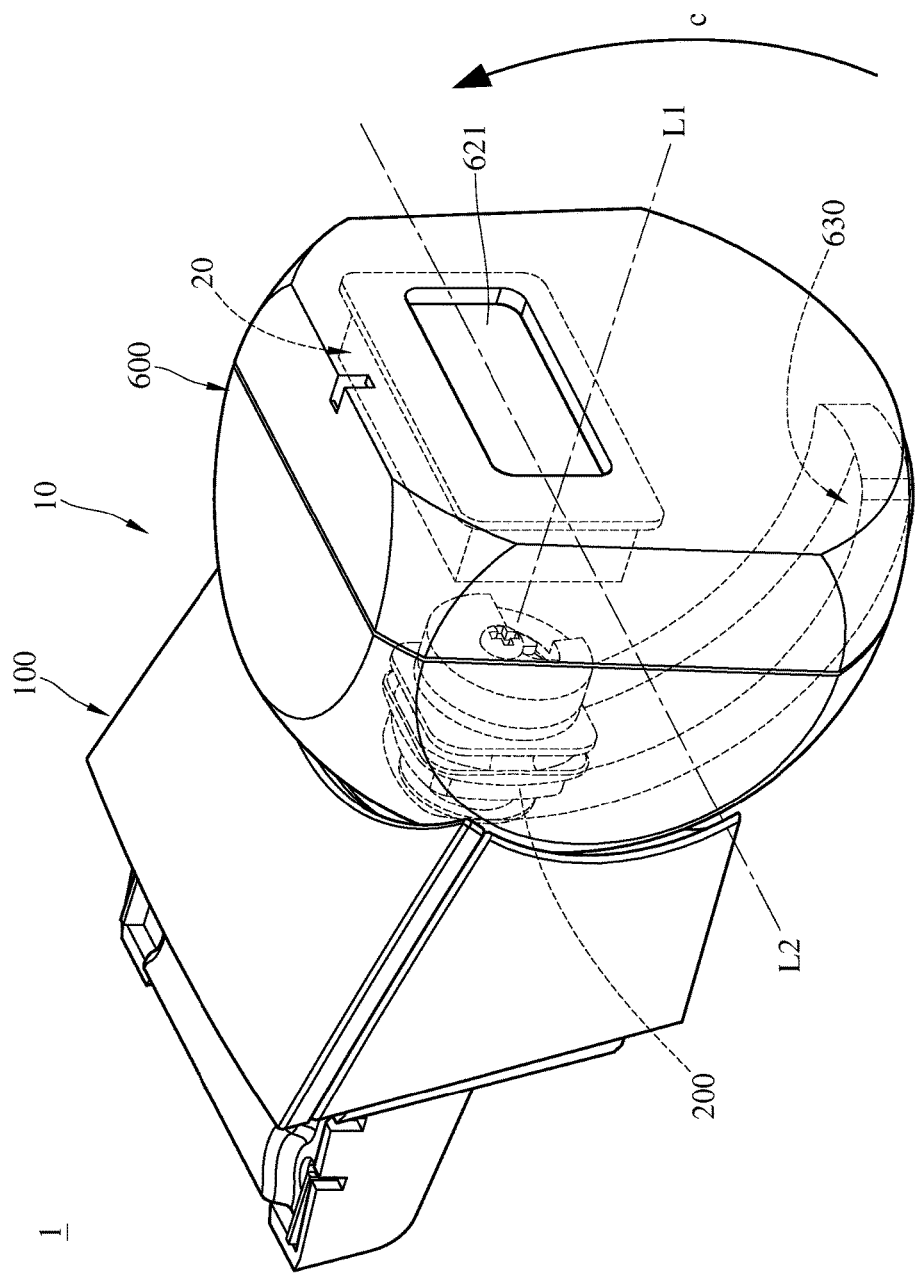

Moreover, the housing 600 is capable of not only rotating left and right but also tilting back and forth. Please refer to FIG. 11 to FIG. 13. FIG. 11 to FIG. 13 are perspective views of the housing of the scanning device illustrated in FIG. 1 rotating in a direction of an arrow c.

As shown in FIG. 11 and FIG. 12, the housing 600 tilts 5 degrees backward so that the optical scanner 20 is capable of scanning the barcode on the goods located at a rear side of the housing 600.

As shown in FIG. 13, the rotatable collar 200 is slidably installed in the adjustment groove 630 of the housing 600, and therefore the housing 600 is capable of rotating forward (in a direction of an arrow c) by the rotatable collar 200. A third rotatable angle determined by the length of the adjustment groove 630 is about 95 degrees in this embodiment so that the transparent part 621 of the housing 600 is capable of facing forward. Therefore, the optical scanner 20 (as shown in FIG. 1) is capable of scanning the barcodes on the goods located in front of the housing 600.

As a result, the scanning device 1 has the capability of rotating left, right, back and forth so that the scanning device 1 is capable of having a half-spherical scanning area. Therefore, the scanning device 1 with the half-spherical scanning area solves the problem about the rotatable angle limitation in conventional barcode scanner, and every user can rapidly and smoothly scan the barcodes on the goods by the scanning device 1 in the present disclosure.

According to the scanning device and the rotatable assembly of the disclosure, the housing installed on the rotatable collar is capable of rotating 180 degrees counterclockwise and 180 degrees clockwise by the first slide groove of the rotatable collar, the first slider and the second slider of the rotatable stopper and the second slide groove of the fixed stopper. Therefore, the optical scanner installed in the housing has the 360 degrees scanning range, and every user can rapidly and smoothly scan the barcodes on the goods by the scanning device.

In addition, the housing installed on the rotatable collar is capable of rotating 90 degrees forward and 5 degrees backward due to the fact that the rotatable collar is capable of sliding in the adjustment groove of the housing. Therefore, the optical scanner installed in the housing has the half-spherical scanning area.

What is claimed is:

1. A rotatable assembly, comprising:
   a rotatable collar having a first slide groove;
   a rotatable stopper comprising a first slider and a second slider which are opposite to each other, the first slider slidably installed in the first slide groove, the rotatable collar being rotatable relative to the rotatable stopper within a first rotatable angle by the first slider; and
   a fixed stopper having a second slide groove, the second slider slidably installed in the second slide groove, the rotatable stopper being rotatable relative to the fixed stopper within a second rotatable angle by the second slider, and a sum of the first rotatable angle and the second rotatable angle is 360 degrees.

2. The rotatable assembly of claim 1, wherein the rotatable collar comprises a first base part and at least one first protrusion, the first slide groove is formed on a side of the first base part, and the at least one first protrusion protrudes from the first base part and is connected to two ends of the first slide groove which are opposite to each other.

3. The rotatable assembly of claim 2, wherein the rotatable stopper further comprises a second base part, the first slider and the second slider are connected to two sides of the second base part which are opposite to each other, respectively.

4. The rotatable assembly of claim 3, wherein the fixed stopper comprises a third base part and at least one second protrusion, the second slide groove is formed on a side of the third base part, the at least one second protrusion protrudes from the side of the third base part and connected to two ends of the second slide groove which are opposite to each other.

5. The rotatable assembly of claim 4, further comprising a fixing part, the fixing part comprising a base body and an axle, the axle protruding from the base body, the first base part of the rotatable collar and the second base part of the rotatable stopper are rotatably installed around the axle of the fixing part, and the third base part of the fixed stopper is fixed to the axle of the fixing part.

6. The rotatable assembly of claim 5, further comprising an elastic component interposed between the first base part of the rotatable collar and the second base part of the rotatable stopper, and the elastic component is compressed by the first base part of the rotatable collar and the second base part of the rotatable stopper.

7. The rotatable assembly of claim 5, further comprising a fixing component penetrating through the third base part of the fixed stopper and screwed to the axle of the fixing part.

8. The rotatable assembly of claim 5, further comprising a housing accommodating the fixed stopper, the rotatable stopper and a part of the axle, the housing having an adjustment groove, the rotatable collar slidably installed in the adjustment groove, the housing being rotatable relative to the rotatable housing by the rotatable collar, and a rotating axis of the housing being orthogonal to a rotating axis of the rotatable collar.

9. The rotatable assembly of claim 8, wherein the housing is rotatable relative to the rotatable collar within a third rotatable angle, and the third rotatable angle is less than 90 degrees.

10. The rotatable assembly of claim 5, wherein the axle has a through hole, the third base part has a slot, the through hole and the slot face each other, and the through hole and the slot are for cable management.

11. A scanning device comprising:
    a rotatable assembly comprising:
      a rotatable collar having a first slide groove;
      a rotatable stopper comprising a first slider and a second slider which are opposite to each other, the first slider slidably installed in the first slide groove, the rotatable collar being rotatable relative to the rotatable stopper within a first rotatable angle by the first slider; and
      a fixed stopper having a second slide groove, the second slider slidably installed in the second slide groove, the rotatable stopper being rotatable relative to the fixed stopper within a second rotatable angle by the second slider, and a sum of the first rotatable angle and the second rotatable angle is 360 degrees; and
    an optical scanner connected to the rotatable collar.

12. The scanning device of claim 11, wherein the rotatable collar comprises a first base part and at least one first protrusion, the first slide groove is formed on one side of the first base part, and the at least one first protrusion protrudes from the first base part and is connected to two ends of the first slide groove which are opposite to each other.

13. The scanning device of claim 12, wherein the rotatable stopper further comprises a second base part, the first slider and the second slider are connected to two sides of the second base part which are opposite to each other, respectively.

14. The scanning device of claim 13, wherein the fixed stopper comprises a third base part and at least one second protrusion, the second slide groove is formed on a side of the third base part, the at least one second protrusion is protruding from the side of the third base part and connected to two ends of the second slide groove which are opposite to each other.

15. The scanning device of claim 14, further comprising a fixing part, the fixing part comprising a base body and an axle, the axle protruding from the base body, the first base part of the rotatable collar and the second base part of the rotatable stopper are rotatably installed around the axle of the fixing part, and the third base part of the fixed stopper is fixed to the axle of the fixing part.

16. The scanning device of claim 15, further comprising an elastic component interposed between the first base part of the rotatable collar and the second base part of the rotatable stopper.

17. The scanning device of claim 15, further comprising a fixing component penetrating through the third base part of the fixed stopper and screwed to the axle of the fixing part.

18. The scanning device of claim 15, further comprising a housing accommodating the fixed stopper, the rotatable stopper and a part of the axle, the housing having an adjustment groove, the rotatable collar slidably installed in the adjustment groove, the housing being rotatable relative to the collar by the rotatable collar, and a rotating axis of the housing being orthogonal to a rotating axle of the rotatable collar.

19. The scanning device of claim 18, wherein the housing is rotatable relative to the rotatable collar within a third rotatable angle, the third rotatable angle is less than 90 degrees.

20. The scanning device of claim 15, wherein the axle has a through hole, the third base part has a slot, the through hole and the slot face each other, and the through hole and the slot are for cable management.

* * * * *